(12) United States Patent
Tsuji et al.

(10) Patent No.: US 8,125,647 B2
(45) Date of Patent: Feb. 28, 2012

(54) CHARGED PARTICLE BEAM APPARATUS AND DISPLACEMENT DETECTING CIRCUIT

(75) Inventors: Hiroshi Tsuji, Hitachinaka (JP); Naoma Ban, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 374 days.

(21) Appl. No.: 12/372,374

(22) Filed: Feb. 17, 2009

(65) Prior Publication Data

US 2009/0225326 A1     Sep. 10, 2009

(30) Foreign Application Priority Data

Mar. 5, 2008  (JP) ................................ 2008-054223

(51) Int. Cl.
*G01B 9/02*  (2006.01)
(52) U.S. Cl. ....................................................... 356/486
(58) Field of Classification Search ............... 250/492.2; 356/484, 485, 486, 489, 490
See application file for complete search history.

(56) References Cited

U.S. PATENT DOCUMENTS

| | | | |
|---|---|---|---|
| 5,723,989 A | 3/1998 | Steinlechner | |
| 6,925,423 B2 | 8/2005 | Fukube et al. | |
| 6,927,391 B2 * | 8/2005 | Tokuda et al. | 850/10 |
| 7,057,705 B2 * | 6/2006 | Heintze | 355/53 |
| 7,057,739 B2 * | 6/2006 | Hill | 356/500 |
| 7,205,554 B2 * | 4/2007 | Tokuda et al. | 250/492.1 |
| 7,230,723 B2 * | 6/2007 | Yamaguchi et al. | 356/605 |

FOREIGN PATENT DOCUMENTS

| | | | |
|---|---|---|---|
| JP | 9-505143 A | 5/1997 | |
| JP | 11-016815 A | 1/1999 | |
| JP | 2003-086126 | 3/2003 | |
| JP | 2003-108223 A | 4/2003 | |
| JP | 2006-215020 A | 8/2006 | |

* cited by examiner

*Primary Examiner* — Gregory J Toatley
*Assistant Examiner* — Scott M Richey
(74) *Attorney, Agent, or Firm* — McDermott Will & Emery LLP

(57) ABSTRACT

An object of this invention is to provide a charged particle beam apparatus that can easily evaluate the stability of a position that is irradiated with a charged particle beam.
To achieve the above object, this invention includes a detector that scans a charged particle beam and detects secondary particles that originate from a substrate, and an image processer that displays an image of the substrate on a display based on the secondary particles that are detected by the detector. The image processer is configured to display on the display any two or more members of the group consisting of a scanning image produced by the charged particle beam of the substrate, a wave in time domain showing fluctuations of the irradiation position of the charged particle beam on the substrate, and a power spectrum of the wave in time domain.

4 Claims, 5 Drawing Sheets

| Time | $t_0$ | $t_1$ | $t_2$ | $t_3$ | $t_4$ | $t_5$ | $t_6$ | $t_7$ |
|---|---|---|---|---|---|---|---|---|
| Subtracter (=CounterB−CounterA) | 3 | 2 | 1 | 0 | 0 | 0 | 0 | 0 |
| Counter C | − | − | 6 | 9 | 13 | 11 | 9 | 7 |
| Phase Shift | − | − | 0 | 0 | +π/2 | +π/2 | 0 | 0 |
| λ/(4n) | − | − | 0 | 0 | +1 | 0 | −1 | 0 |
| Digital Out (DO) | − | − | 0 | 0 | 1 | 1 | 0 | 0 |
| Selector | − | − | SW1 | SW1 | SW2 | SW2 | SW1 | SW1 |
| AnalogOut (AO) | − | − | AO1 | AO2 | AO3 | AO4 | AO5 | AO6 |

CHARGED PARTICLE BEAM APPARATUS AND DISPLACEMENT DETECTING CIRCUIT

BACKGROUND OF THE INVENTION

1. Field of the Invention

The present invention relates to a charged particle beam apparatus, and more particularly to a charged particle beam apparatus that displays a scanning image of a substrate produced using a charged particle beam, fluctuations in the charged particle beam irradiation position, fluctuations in a stage position, or their respective power spectra, and evaluates the stability of the charged particle beam irradiation position, as well as to a displacement detecting circuit.

2. Background Art

Recently, with improvements in the levels of integration of semiconductor devices, there is a demand on CD measurement SEMs to have the ability to measure pattern shapes with accuracies of one nanometer or less. Further, there is a demand on defect review SEMs to have a function that detects minute defects of several tens of nanometers.

Regarding both measuring apparatuses and inspecting apparatuses, in many cases the image quality of an acquired image is determined based on contrast and edge sharpness and the like. However, in such cases it is difficult to quantitatively evaluate the stability of an electron beam position. Measurement of an electron beam irradiation position is itself difficult, and it is also difficult to measure positional fluctuations of a stage on which a substrate is mounted at a resolution of one nanometer or less without using a laser length measuring board that has a high resolution.

One known example of measuring an electron beam position is a method of measuring the electron beam position with a knife edge or a pattern edge (for example, see Japanese Patent Laid-Open Publication No. 11-016815 A1). According to the knife edge method, electron beam positions crossing an edge are evaluated by measuring electrons that are not obstructed by the edge, with a Faraday cup below the substrate. In contrast, a method in which a pattern edge is irradiated with an electron beam detects and evaluates secondary electrons that change based on the relation between the pattern edge and the beam diameter of the electron beam. In either method, since evaluation is performed in a state in which a beam diameter is applied to an edge and not deflected, an image can not be seen in this state and electron beam position fluctuations that are synchronous with the image are not obtained.

An apparatus for measuring a phase difference occurring between two electrical signals (reference signal and measurement signal) in a heterodyne interferometer is also known (for example, see Japanese Unexamined Patent Application Publication (Translation of PCT Application) No. 09-505143 A1 (WO 95/14236 A1)). That apparatus is a breakthrough invention that further divides the resolution of a heterodyne interferometer using a digital circuit. For example, with respect to a beat frequency of two megahertz, when the clock frequency is 40 megahertz that is twenty times the beat frequency in speed, the measurement resolution of the phase difference can be enhanced to $\frac{1}{10}$, by 2× (beat frequency)/(clock frequency).

SUMMARY OF THE INVENTION

An operator of a defect review SEM simply evaluates the stability of an electron beam irradiation position on a display. To achieve this, a measuring method that is appropriate for defect shapes and critical dimensions of recent semiconductor devices is also required at the same time.

Regarding electron beam position measurement, a signal waveform of a voltage into which a current representing light and darkness is converted is obtained from a secondary electron detector each time one line is scanned on a pattern edge. This signal waveform is repeated for one frame. The frequency of a secondary electron detection signal includes a powerline frequency and a vibration frequency that are low frequencies in comparison to a deflection frequency, as well as the deflection frequency. A problem is to extract only low-frequency fluctuation components from the secondary electron detection signal and to measure a displacement of one nanometer or less.

A problem of stage position measurement is to measure a displacement of one nanometer or less. Although a high S/N ratio may be achieved by detecting changes in the duty cycle of a gate output waveform of a reference signal and a measurement signal, the displacement direction is not known.

An object of the present invention is to provide a charged particle beam apparatus that can easily evaluate the stability of a position which is irradiated with a charged particle beam.

To solve the above described problems, an embodiment of the present invention provides a charged particle beam apparatus that has a detector that scans a charged particle beam and detects secondary particles that originate from a substrate and that displays an image of the substrate on a display based on the secondary particles that are detected by the detector, wherein any two or more members of the group consisting of a scanning image produced by the charged particle beam of the substrate, a wave in time domain showing fluctuations of an irradiation position of the charged particle beam on the substrate, and a power spectrum of the wave in time domain are displayed on the display.

In addition, the charged particle beam apparatus further comprises a heterodyne interferometer that measures a position of a stage on which the substrate is mounted, wherein any two or more members of the group consisting of a scanning image produced by the charged particle beam of the substrate, a first wave in time domain showing fluctuations of an irradiation position of the charged particle beam on the substrate, a second wave in time domain showing a position of the stage, a power spectrum of the first wave in time domain, and a power spectrum of the second wave in time domain, are displayed on the display.

According to the embodiment of the present invention, it is possible to provide a charged particle beam apparatus that enables easy evaluation of the stability of a position which is irradiated with a charged particle beam.

DETAILED DESCRIPTION OF THE PREFERRED EMBODIMENTS

An embodiment of the present invention is described hereunder. With regard to electron beam position measurement, by disposing a low-pass filter that attenuates a deflection frequency downstream of a secondary electron detector, only electron beam position fluctuations in synchronization with a power line and vibrations are obtained. Regarding conversion to a displacement, the conversion is performed based on a voltage change amount of the secondary electron detector and a deflection amplitude amount when scanning one line.

The situation regarding stage position measurement is as follows. For the reference signal of a heterodyne interferometer, a rectangular wave (duty cycle 50%) of a constant frequency is outputted. For the measurement signal thereof, the frequency of the rectangular wave (duty cycle 50%) increases as a target object approaches, and the frequency decreases as the target object moves away. By maintaining a phase difference $\phi$ between the two electrical signals, the reference signal and the measurement signal, within a certain range, the direction of increase or decrease of the duty cycle of the gate output of the measurement signal and the reference signal matches the displacement direction. Therefore, while detecting the phase difference of the reference signal with respect to the measurement signal, the phase of the reference signal is shifted so that the phase of the reference signal with respect to the measurement signal is, for example, $\pi/2 \leq \phi < \pi$. The gate output of the reference signal whose phase is shifted and the measurement signal are detected. Since the beat frequency is included in the detected waveform, the beat frequency is removed using the low-pass filter. As a result, displacement information is obtained that is at a lower frequency than the beat frequency and whose direction is determined.

Figure 1:
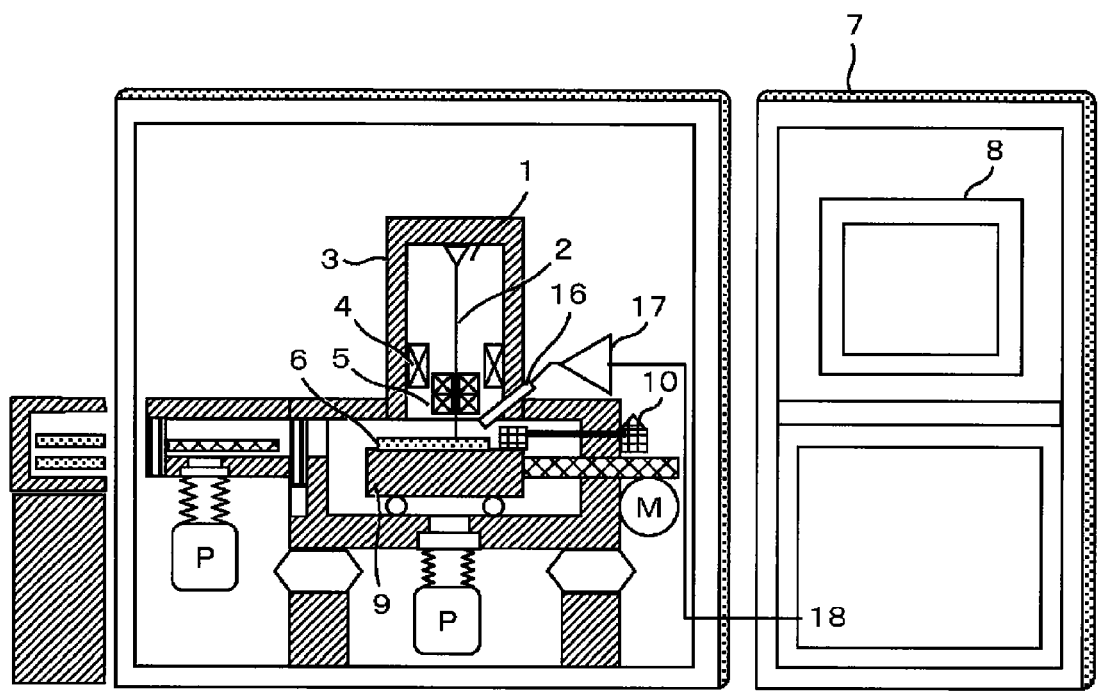
FIG. 1 is a longitudinal sectional view showing the schematic configuration of a charged particle beam apparatus.

FIG. 1 is a longitudinal sectional view showing the schematic configuration of a charged particle beam apparatus. Although according to this embodiment an example of an electron beam is described as a charged particle beam, the same applies to a charged particle carrying a positive charge. An electron beam 2 emitted from an electron source 1 is converged by an objective lens 4 inside an electron optical column 3 and deflected by a deflection lens 5. Secondary electrons that are generated by scanning of a deflection region of a substrate 6 with the electron beam 2 are detected with a detector 16, and information such as the surface shape of the substrate 6 can be obtained based on the detection signal. The secondary electron signal is amplified with an amp 17 and converted into an image signal by an image processor 18 so that information such as the surface shape of the substrate 6 is displayed as an image on a display 8 of a console 7.

In the case of measuring or inspecting the entire surface of the substrate 6, the position of a stage 9 on which the substrate 6 is mounted is measured with a heterodyne interferometer 10 and the stage 9 is moved to a predetermined position so that image information can be obtained at a new position.

To acquire a clear image at a high magnification, it is necessary to make the beam diameter of the electron beam 2 thin and to stabilize the irradiation position of the electron beam 2 with respect to the substrate 6. Accordingly, it is necessary to ascertain the relationship between the position of the stage 9 and the position of the electron beam 2 with respect to the stage 9, and in order to check the state of the apparatus a configuration is employed with which the stability of the position of the electron beam 2 can be evaluated in a short time using the display 8. The method of measuring the position of the electron beam 2 and the method of measuring the position of the stage 9 are described later.

Figure 2:
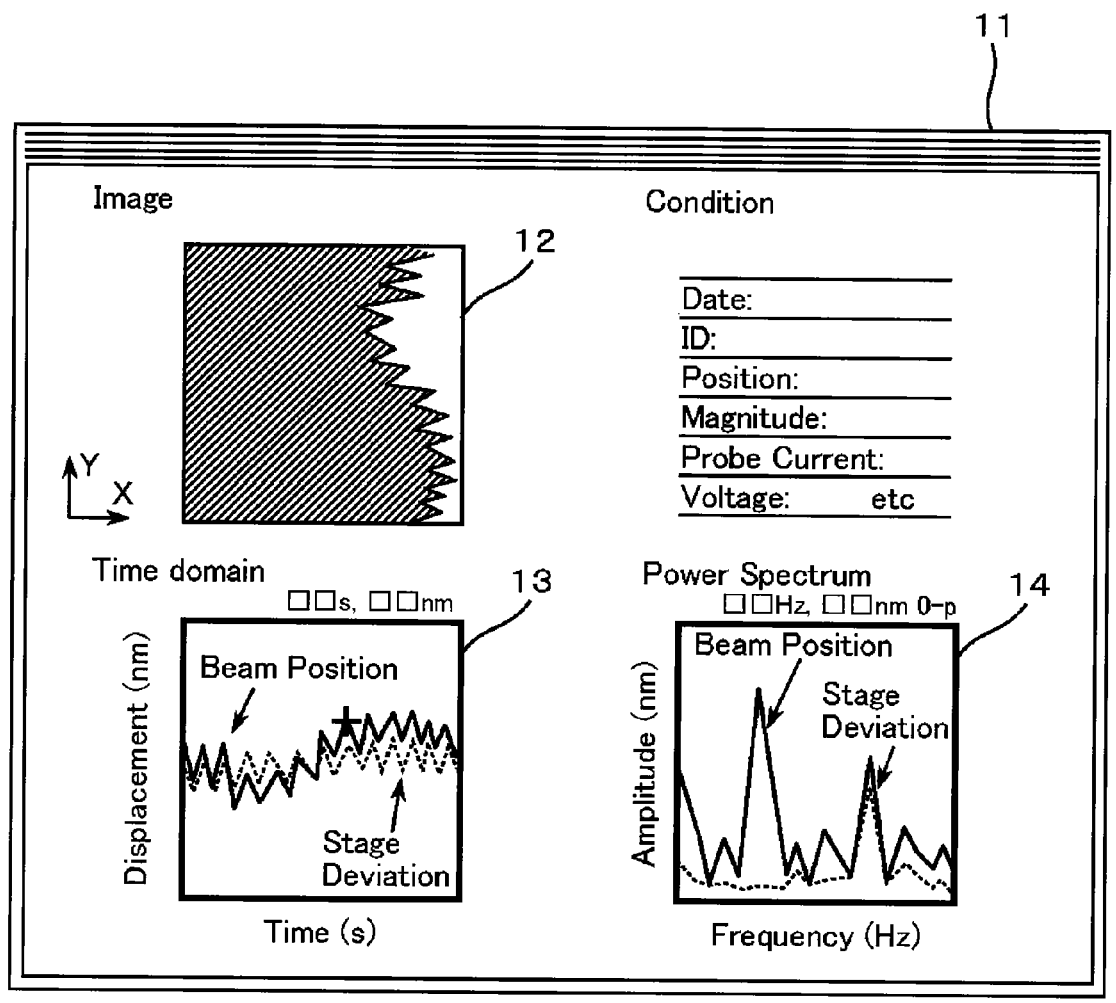
FIG. 2 is a screen view that shows an example of an image that is displayed on a display.

FIG. 2 is a screen view that shows an example of an image displayed on the display 8. An image 12, a wave in time domain 13 of the electron beam position, and a power spectrum 14 are laid out within a single window 11 of the screen of the display 8. By moving the cursor, the respective graphs display the time and displacement, and the frequency and amplitude value. The image, waveform, and power spectrum can also be saved. By comparing waves in time domain or power spectra of a stage position, the state of electron beam position fluctuations can be determined. For example, if a stage position and an electron beam position change synchronously, and the amplitude is the same, it can be determined that fluctuations are caused by mechanical vibrations of the stage. Further, in a case in which the stage does not move and only the electron beam position changes with the power line frequency, it can be determined that the power line is the cause. Generally, fluctuations in an electron beam position are caused by the occurrence of vibrations in the electron optical column and vibrations attributable to the power line, in addition to stage vibrations. Therefore, by retaining the daily data for electron beam position fluctuations and fluctuations in the position of the stage, the state of the apparatus can be determined.

Figure 3:
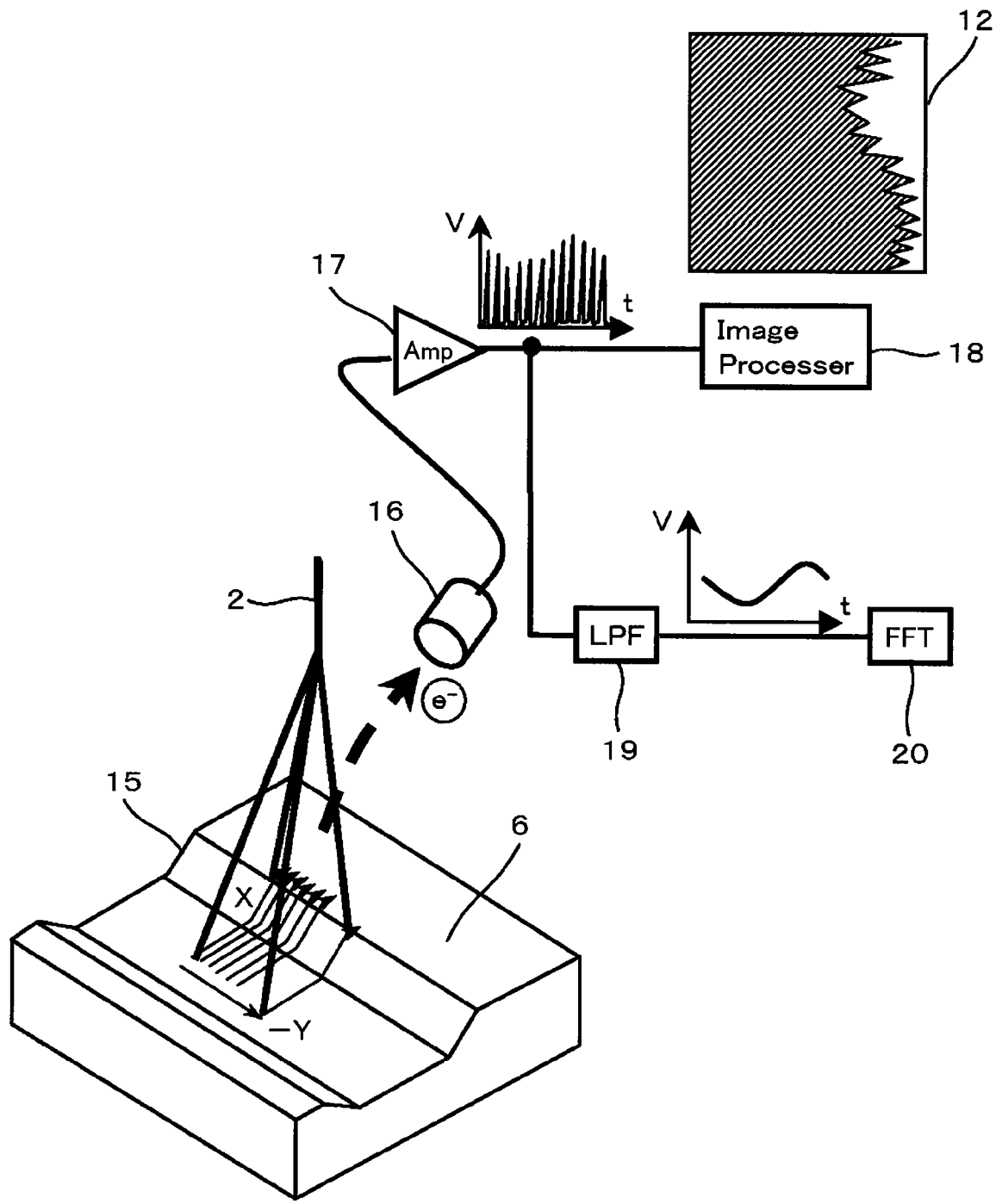
FIG. 3 is an oblique perspective view that illustrates a method of measuring an electron beam position.

FIG. 3 is an oblique perspective view that illustrates a method of measuring an electron beam position. A pattern edge 15 of the substrate 6 is provided so as to be included in the deflection region of the electron beam 2, and the emitted secondary electrons are outputted by the detector 16 and amplified by the amp 17. In a state in which the pattern edge 15 is being deflectingly scanned with the electron beam 2, the display for an edge portion of an image displayed on the display is bright, and for other regions the display is dark. An image obtained by processing the secondary electron detection signal with the image processer 18 appears as shown in the image 12. Since unstable behavior of the electron beam position appears as changes in the light/dark ratio for each line, by passing the light/dark signals of a deflection period through a low-pass filter 19, only the fluctuation component of the electron beam is obtained. Further, an amplitude value for each frequency is obtained by an FFT (Fast Fourier Transform) 20.

Figure 4:
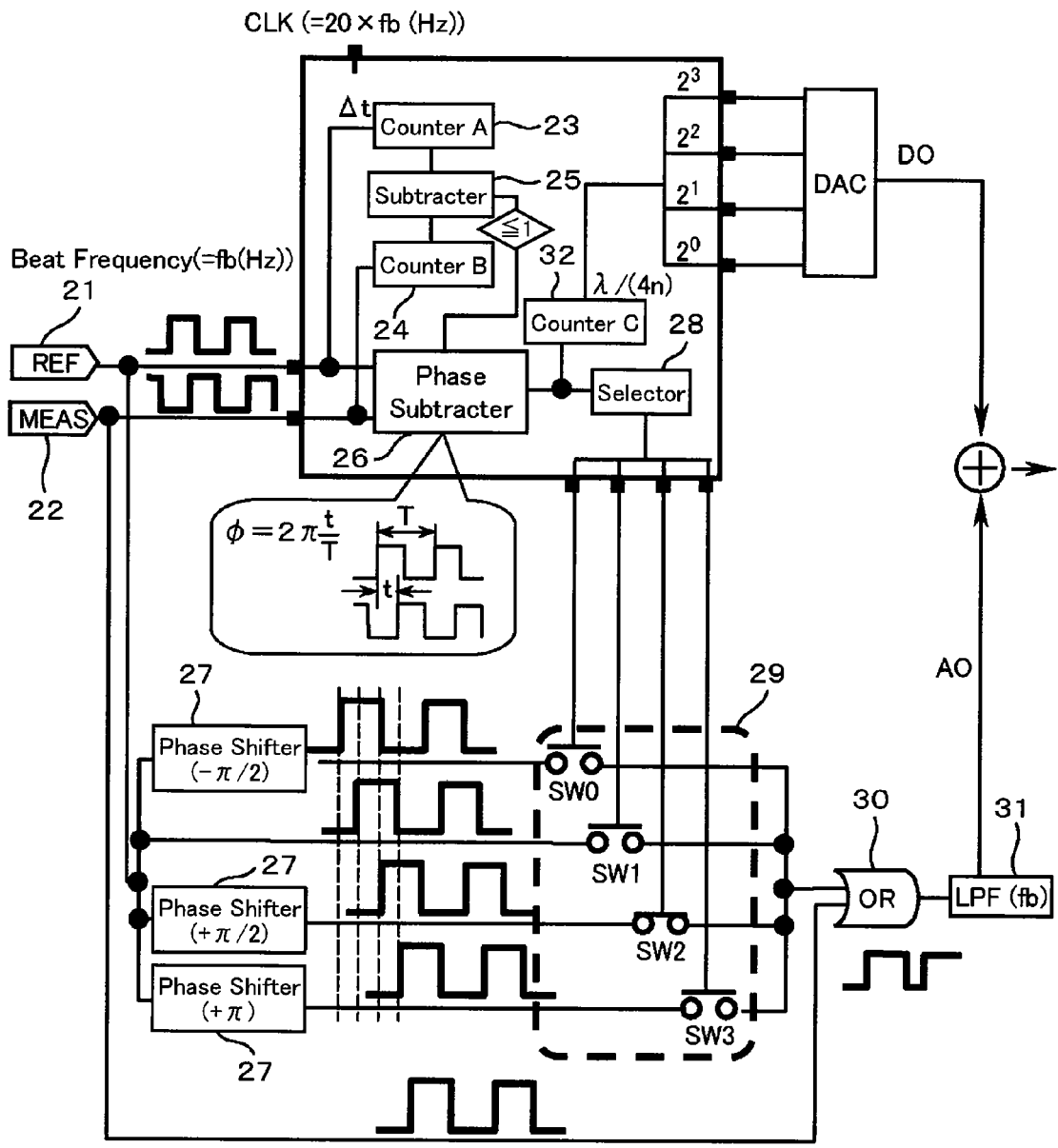
FIG. 4 is a view that illustrates a displacement detecting circuit of a heterodyne interferometer.

FIG. 4 is a view that illustrates a displacement detecting circuit of a heterodyne interferometer, and describes a stage displacement detection method. The basic frequency of a reference signal and a measurement signal of a heterodyne interferometer is the beat frequency (fb (Hz)) of a two-frequency laser. The frequency of a measurement signal 22 varies with changes in the position of a measurement target object. In the conventional method, the numbers of pulses per unit time of a reference signal and a measurement signal are counted by their respective counters, and the difference is multiplied by the resolution (for example, $\lambda/(2n)$, n=1, 2, 3, . . . ) to calculate the displacement amount.

A reference signal 21 and the measurement signal 22 are sent to a digital circuit and an analog circuit. The clock frequency of the digital circuit is, for example, a high frequency that is 20 times the beat frequency. It is assumed that the reference signal 21 and the measurement signal 22 are both TTL (Transistor-Transistor Logic) signals. The number of pulses of the reference signal 21 is counted by a counter A 23, and the number of pulses of the measurement signal 22 is counted by a counter B 24. The difference between the two pulse numbers is obtained by a subtracter 25. When the difference is one or less, that is, in terms of phase difference, it reaches a value equal or less than $\pi$, detection of the phase difference starts at a phase subtracter 26. The method of detecting the phase difference is as follows: a time difference t between an instant that the reference signal 21 switches from L to H level and an instant that the measurement signal 22 switches from L to H level is calculated based on the number of clock pulses, and a phase φ is calculated based on one period of the reference signal.

In contrast, in the analog circuit, signals of different phases are created in the manner −π/2, +π/2, +π with respect to the measurement signal 22 by phase shifters 27 using a two-stage one shot multi vibrator. In order that the phase difference of the reference signal 21 with respect to the measurement signal 22 is within a certain range (from π/2 to π), analog switches 29 (SW0 to SW3) are switched using the signal of a selector 28 to select a waveform in which the phase of the reference signal is shifted. The selected reference signal and measurement signal are sent to a gate 30. A waveform outputted from the gate is a waveform having a different beat frequency and duty cycle. This waveform is sent to a low-pass filter 31 to obtain lower frequency displacement information by removing the beat frequency.

Subsequently, at the digital circuit again, the number of times the phase switches is counted with a counter C 32. In this connection, a switching amount π/2 for one time corresponds to a displacement of $\lambda/(4n)$. The value of the counter C 32 is outputted digitally.

The sum of the output (DO) of the digital circuit and the output (AO) of the analog circuit obtained in this manner is the displacement amount. Regarding the adding method, the digital output may be converted into an analog output and added with the analog circuit, or the analog output may be digitally converted and added with the digital circuit.

Figure 5:
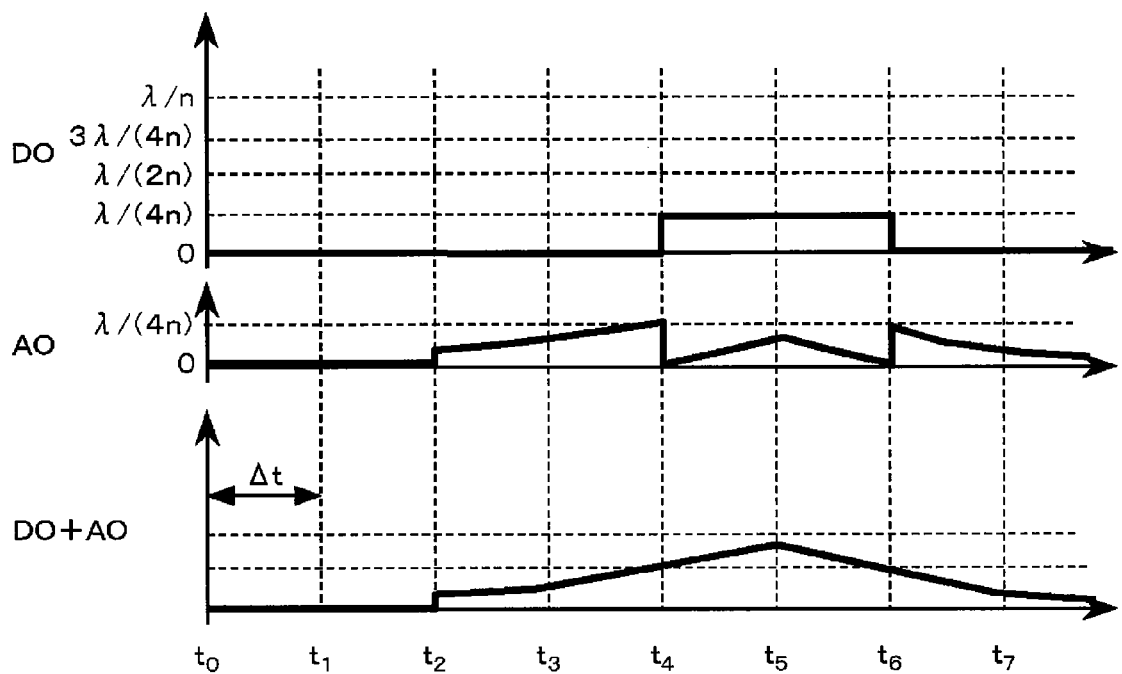
FIG. 5 is a timing chart of a displacement detecting circuit.

FIG. 5 is a timing chart of the displacement detecting circuit. The output values of FIG. 4 are described together with time passage. The difference between the counter A and the counter B decreases in the manner 3, 2, 1. With respect to the reference signal, the output of the counter C changes from 6 to 9 to 13 under a condition that sampling is performed at 20 points in one period. At times t2 and t3, since the phase difference falls $\pi/2 \leq \phi < \pi$, the phase shift amount is assumed to be zero and the analog switch SW1 of the selector row is selected. At times t4 and t5, the phase difference falls $\pi < \phi \leq 3\pi/2$ and therefore the phase shift amount is assumed to be +π/2 and the analog switch SW2 is selected. To intentionally shift the phase, an amount equivalent to the displacement thereof is added to the counter C. The timing charts shown at the lower part of FIG. 5 show the digital output value (DO), the analog output value (AO), and the sum of these.

In this connection, the voltage of AO when the phase difference shifts by π/2 is (L+3H)/4, the voltage of AO when the phase difference shifts by π is Hi, and (H−L)/4(≈1V) is obtained as the voltage amplitude. If it is assumed that the original resolution of the heterodyne interferometer is $\lambda/(2n)$, then the displacement amplitude of AO is $\lambda/(4n)$. If the noise of AO is suppressed to 10 mV or less, the resolution of the displacement detecting circuit of the present invention is $\lambda/(4n \times 100)$, and thus can be improved to a two-hundredth of the original resolution.

As described in the foregoing, according to an embodiment of the present invention, by merely observing the edge of a pattern to display, in a superimposed manner, waves in time domain of electron beam irradiation position fluctuations and stage position fluctuations or to display their respective power spectra in a superimposed manner, it is possible to evaluate an amplitude for each frequency or a fluctuation amount per time, and also to easily evaluate the stability of a charged particle beam irradiation position in a charged particle beam apparatus.

What is claimed is:

1. A charged particle beam apparatus, comprising:
a detector that scans a charged particle beam and detects secondary particles that originate from a substrate;
an image processer that displays an image of the substrate on a display based on the secondary particles that are detected by the detector; and
a low-pass filter that is provided downstream of the detector and attenuates a deflection frequency of the charged particle beam apparatus;
wherein the image processer displays on the display any two or more members of the group consisting of:
a scanning image produced by the charged particle beam of the substrate,
a wave in time domain showing fluctuations of an irradiation position of the charged particle beam on the substrate, and
a power spectrum of the wave in time domain.

2. A charged particle beam apparatus, comprising:
a detector that scans a charged particle beam and detects secondary particles that originate from a substrate;
an image processer that displays an image of the substrate on a display based on the secondary particles that are detected by the detector;
a first low-pass filter that is provided downstream of the detector and attenuates a deflection frequency of the charged particle beam apparatus; and
a heterodyne interferometer that measures a position of a stage on which the substrate is mounted;
wherein the image processer displays on the display any two or more members of the group consisting of:
a scanning image produced by the charged particle beam of the substrate,
a first wave in time domain showing fluctuations of an irradiation position of the charged particle beam on the substrate, the first wave being obtained from a signal passed through the low-pass filter,
a second wave in time domain showing a position of the stage that is measured with the heterodyne interferometer, the second wave being in synchronization with the first wave in time domain,
a power spectrum of the first wave in time domain, and
a power spectrum of the second wave in time domain.

3. The charged particle beam apparatus according to claim 2, further comprising:
a displacement detecting circuit, comprising:
digital counters that count the numbers of optical beats of a reference signal and a measurement signal of the heterodyne interferometer, respectively;
a subtracter that obtains a difference between the reference signal and the measurement signal;
a phase shift circuit that shifts a phase of a waveform of the reference signal;
a switching circuit that selects a specific single signal waveform among waveforms of phase shifted signals that have been subjected to phase shifting by the phase shift circuit;
a gate that detects a phase difference between the reference signal and the measurement signal; and
a second low-pass filter that removes a signal of a heterodyne frequency from an output of the gate.

4. A displacement detecting circuit, comprising:
a heterodyne interferometer;
digital counters that count the numbers of optical beats of a reference signal and a measurement signal of the heterodyne interferometer, respectively;
a subtracter that obtains a difference between the reference signal and the measurement signal;
a phase shift circuit that shifts a phase of a waveform of the reference signal;

a switching circuit that selects a specific single signal waveform among waveforms of phase shifted signals that have been subjected to phase shifting by the phase shift circuit;

a gate that detects a phase difference between the reference signal and the measurement signal; and a low-pass filter that removes a signal of a heterodyne frequency from an output of the gate.

* * * * *